UNITED STATES PATENT OFFICE.

SAMUEL P. DUFFIELD, OF DETROIT, MICHIGAN.

IMPROVEMENT IN THE MANUFACTURE OR PURIFYING OF COMMON SALT.

Specification forming part of Letters Patent No. 41,980, dated March 22, 1864.

*To all whom it may concern:*

Be it known that I, SAMUEL P. DUFFIELD, of Detroit, in the county of Wayne and State of Michigan, have invented a new and useful Improvement in the Manufacture of Salt; and I do hereby declare that the following is a full and exact description thereof.

In the manufacture of common salt from saline waters containing as impurities chloride of calcium and of magnesium, a very inferior article is produced if the chlorides present as impurities are not removed. Meats packed with such salt will often spoil. After much practical experience I have invented a simple, effectual, and economical method of producing an excellent article of common salt from brines containing the above-mentioned impurities.

My invention or improvement in the manufacture of common salt consists in the use of a soluble alkaline silicate for the purpose of separating chloride of calcium or of magnesium from the chloride of sodium in brines or salines containing such chlorides in solution.

My improvement is especially applicable to such salines as occur at the East Saginaw and Bay City wells in the State of Michigan. Usually I evaporate the brine rapidly to the crystallization of the common salt, and then run off the mother-liquor, which contains a large amount of the chlorides of calcium and magnesium. I then add boiling water to redissolve the crystals of common salt, and treat the brine thus formed with a solution of soluble alkaline silicate in the proportion of two parts of anhydrous silicate to one part of anhydrous chloride of calcium or magnesium. A chemical interchange then takes place, the silicate of lime and magnesia being formed, and also chlorides of potassa or soda. As these silicates are insoluble, they form a precipitate which is easily removed, while the common salt remains in solution. When the precipitate subsides, the brine is either decanted or filtered off, and then evaporated, and thus the salt is obtained very pure.

Instead of treating the brine with a solution of the silicate, the impure common salt may be heated or fused with the anhydrous silicate of potassa or soda, and water then added to dissolve the fused mixture, and thus the impurities be removed from the salt. Other silicates may be employed, though I prefer those above mentioned.

For the sake of economy I prepare the silicate of potash from the ashes resulting from the combustion of wood in the evaporation of the brine. Thus one ton of ashes is intimately mixed with from one-eighth to one-quarter ton of pure quartz sand, and this mixture is heated in a reverberatory furnace until the silica and alkali are chemically united, forming a molten mass. This silicate is then run off into a clean dry kettle and stirred rapidly until cool. Thus a soluble silicate of potassa is formed. This silicate is dissolved in water, when it is ready for use, as above described. If the use of so much potash be thought objectionable, a mixture of wood-ashes and common salt may be used; but this makes the silicate more expensive. A silicate may be prepared from common caustic soda or potash, or their carbonates.

By this process the iron, if any be present in the salines, is left behind with the magnesia and lime, and thus separated from the salt.

I do not claim any discovery of new facts in chemistry, but rather the application of known facts to the manufacture of salt, constituting a new process of manufacture.

Having thus fully described my invention, what I claim, and desire to secure by Letters Patent of the United States, is—

The use of soluble alkaline silicates for the purpose of purifying brines or salines, or common salt itself, by the precipitation of the chloride of calcium or of magnesium, or both, substantially in the manner and for the purposes set forth.

SAMUEL P. DUFFIELD.

Witnesses:
 G. BREED,
 D. BREED.